United States Patent Office 3,551,377
Patented Dec. 29, 1970

3,551,377
METHOD OF PRODUCING HEAT-RESISTANT RUBBER
Kuzma Andrianovich Andrianov, Ul. Fersmana 3, kv. 102, Moscow, U.S.S.R.
No Drawing. Filed July 10, 1968, Ser. No. 743,603
Int. Cl. C08g 51/04
U.S. Cl. 260—37                8 Claims

ABSTRACT OF THE DISCLOSURE

Heat-resistant rubber is prepared by vulcanizing a mixture of a polydiorganosiloxane, a polyorganoelemento dimethyl (methylphenyl) siloxane, a filler and a vulcanizing agent. An even more heat-resistant product is obtained if a metal oxide is added to the mixture.

The present invention relates to methods of producing heat-resistant rubber. At present, in the production of heat-resistant rubber by means of vulcanization, polydiorganosiloxanes are widely used, mixed with a filler, a vulcanizing agent and metal oxides. The rubber produced by such methods is capable of withstanding temperatures of 180–200° C. for a long period of time (1 year), temperature of 250° C. for a limited period of time (1 to 2 months), and temperature of 300° C. for a short period of time.

However, such types of rubber rapidly age as a result of thermal-oxidative degradation processes which lead to quick deterioration of articles made from the rubber.

It is the object of the present invention to provide a method of producing rubber capable of withstanding the effect of temperature in the range of 250–300° C. for a long period of time and the effect of temperatures of 350° C. for a short period of time.

This object has been accomplished by a method of producing heat-resistant rubber comprising vulcanizing a mixture consisting of a polydiorganosiloxane having the formula:

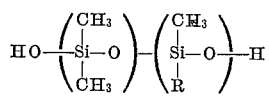

wherein R is $CH_3$, —CH=CH$_2$, —C$_6$H$_5$
—CH$_2$CH$_2$CH$_2$CN or CH$_2$CH$_2$CF$_3$ and a polyorganoelementodimethyl(methylphenyl)siloxane having the formula:

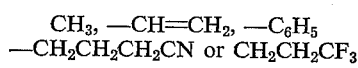

wherein
$\epsilon$ is B, Al, Tri or P;
R' is Ch$_3$; —C$_6$H$_5$ or —CH$_2$NHC$_6$H$_5$;
R" is C$_2$H$_5$, —iso—C$_3$H$_7$ or —C$_4$H$_9$;
$k$ is the valence of the element $\epsilon$;
X is —OCOCH$_3$; —CH$_3$; —OPO(CH$_3$) R'''; wherein R''' is —CH$_3$, —OCH$_3$, —OC$_4$H$_9$, —OC$_2$H$_5$ or —OC$_6$H$_5$;
$n$ is an integer from 29 to 1800; and
$m$ is an integer from 2 to 4;

as well as a filler, a vulcanizing agent and metal oxides.

Substances such as highly dispersed silicon dioxide are used as the filler. As the vulcanizing agent use can be made of various organic peroxides. As the metal oxides use can be made of iron oxide, titanium dioxide. Polyorganoelementodimethyl(methylphenyl)siloxanes are introduced to the rubber mixture in an amount of 5–25 parts by weight per 100 parts by weight of the polydiorganosiloxane. The vulcanization of the said rubber mixtures can be carried out by the hot method in a press or by cold vulcanization at normal temperatures with the aid of catalysts usually employed for this purpose.

It is known that the thermal-oxidative degradation of linear polydiorganosiloxanes proceeds not only with breaking the Si—C bond, but also through the degradation of the Si—C—Si bond in linear polymers.

Thus the problem of increasing the heat-stability of elastomers, especially those which perform under high temperatures (higher than 250° C.), involves not only the protection of the organic side groups from attack by radicals, but also the stabilization of the main molecular chains.

Taking into consideration the above-mentioned chemical processes which take place during thermal-oxidation degradation of polydiorganosiloxanes and materials derived therefrom, we have carried out an investigation with the purpose of introducing oligomers into the polydiorganosiloxane, more precisely polyorganoelementodimethyl(methylphenyl)siloxanes, i.e., linear oligomers whose molecular chains consist of alternating atoms of silicon, oxygen, and other elements. The elements which comprise the chains of such polyorganoelementodimethyl-(methylphenyl)siloxanes are selected on the basis of their ability to increase the rigidity of the siloxane chain and serve as centers which are capable of retarding thermal-oxidative degradation processes.

All the above-mentioned polyorganoelementodimethyl (methylphenyl)siloxanes have as the terminal groups —OH or OR", i.e., groups which, during the technological work-up of polydiorganosiloxanes into rubber, are capable of undergoing reactions with the rubber via the terminal groups.

The present invention makes it possible to produce rubber which is highly heat-resistant at 300° C. and 350° C. Thus the thermal stability of the rubber produced according to the present method is three to ten times greater in the said range of temperatures than the standard rubber.

For a better understanding of the present invention, the following examples are given by way of illustration.

EXAMPLE 1

A rubber mixture was prepared from the following components, the amount being expressed in parts by weight:

(1) Polydimethylsiloxane _____ 100
(2) Poly - bis - (methylbutoxyphosphineoxy)titanomethylphenylsiloxane _____ 5
(3) Highly dispersed silicon dioxide _____ 40
(4) Benzoyl peroxide _____ 3

Poly - bis - (methylbutoxyphosphineoxy)titanomethylphenylsiloxane has the following structure:

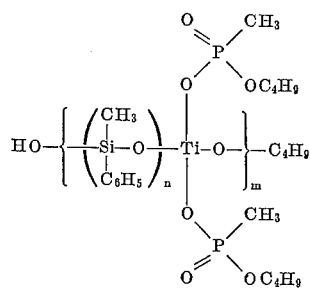

wherein $n$ is an integer from 29 to 1200, and was synthesized by the condensation reaction of α,ω-dihydroxypolymethylphenylsiloxane with bis-(methylbutoxyphosphineoxy)-dibutoxytitanium.

The preparation of the rubber mixture was carried out on a mill at 1:1.14 friction, at a temperature of 20–25° C.

During milling there were introduced first raw rubber and then the oligomer followed by mixing of the two. Then half of the silicon dioxide was introduced together with the benzoyl peroxide, followed by the addition of the rest of silicon dioxide, the drawing of the rubber mixture into a thin sheet, and its removal from the mill. The time for preparing the rubber mixture varies, depending on the amount of charged materials.

Vulcanization was carried out at 143° C. for 30 minutes, followed by cooling of the vulcanization to 20–10° C. in a mold under pressure. To complete the vulcanization the samples were kept at a thermostatically controlled temperature of 200° C. for 12 hours.

Vulcanized samples were subjected to aging at 300° C. for comparison, similar tests were carried out with standard rubber of the same composition except that it did not contain poly - bis - (methylbutoxyphosphineoxy) - titanomethylphenylsiloxane.

The test results are summarized in Table 1. In this and the following tables P denotes the tensile strength limit in kg./cm.$^2$, and L, the relative elongation at the breaking point in percent. As may be seen from the data in Table 1, the standard rubber became brittle after 4 days of heating, whereas samples of rubber made according to Example 1 could withstand 7 days of heating.

TABLE 1.—RUBBER TEST RESULTS

| Aging time (days) | Indices | Aging temperature, 300° C. | |
|---|---|---|---|
| | | Standard rubber | Rubber produced according to Example 1 |
| 0 | P | 42.5 | 47.1 |
| | L | 190 | 225 |
| 2 | P | 38.9 | 37.6 |
| | L | 100 | 135 |
| 4 | P | 31.6 | 37.6 |
| | L | 50 | 115 |
| 5 | P | ---------- | 25.5 |
| | L | ---------- | 75 |
| 6 | P | ---------- | 35.1 |
| | L | ---------- | 65 |
| 7 | P | ---------- | 30.1 |
| | L | ---------- | 50 |

EXAMPLE 2

A rubber mixture was prepared from the following components, the amounts being expressed in parts by weight:

(1) Polydimethylpolymethylvinylsiloxane (the concentration of methylvinylsiloxane units is 0.1 mole percent) _____ 100
(2) Poly - bis - (methylbutoxyphosphineoxy)titanomethylphenylsiloxane _____ 15
(3) Aerosil 2490 _____ 20
(4) Iron oxide _____ 2.5
(5) Benzoyl peroxide _____ 0.5

The preparation of the rubber mixture was carried out on a mill at a 1:1.14 friction, at a temperature of 20–25° C. During milling there were introduced first raw rubber, and then the oligomer followed by mixing of the two; iron oxide and benzoyl peroxide were then introduced into the mixture, followed by the introduction of the Aerosil. The rubber mixture was drawn into a thin sheet and removed from the mill.

Vulcanization of the rubber mixture was carried out under the same conditions as in Example 1.

Vulcanized samples were subjected to aging at 300° C. and 350° C. For comparison, similar tests were carried out with standard rubber which has the same composition except that it does not contain poly-bis-(methylbutoxyphosphineoxy)titanomethylphenylsiloxane.

The test results are summarized in Tables 2 and 3.

TABLE 2.—RUBBER TEST RESULTS

| Aging time (hours) | Indices | Aging temperature, 300° C. | |
|---|---|---|---|
| | | Standard rubber | Rubber produced according to Example 2 |
| 0 | P | 40 | 50 |
| | L | 380 | 360 |
| 50 | P | 21 | 36 |
| | L | 150 | 290 |
| 100 | P | 13 | 26 |
| | L | 75 | 210 |
| 200 | P | ---------- | 26 |
| | L | ---------- | 125 |
| 300 | P | ---------- | 25 |
| | L | ---------- | 100 |
| 400 | P | ---------- | 23 |
| | L | ---------- | 80 |

TABLE 3.—RUBBER TEST RESULTS

| Aging time (hours) | Indices | Aging temperature, 350° C. | |
|---|---|---|---|
| | | Standard rubber | Rubber produced according to Example 2 |
| 0 | P | 40 | 50 |
| | L | 380 | 360 |
| 2 | P | 15 | 11 |
| | L | 60 | 230 |
| 5 | P | ---------- | 20 |
| | L | ---------- | 160 |
| 10 | P | ---------- | 27 |
| | L | ---------- | 125 |
| 15 | P | ---------- | 30 |
| | L | ---------- | 40 |

As seen from the data in Tables 2 and 3, the standard rubber could withstand heating to a temperature of 300° C. and 350° C. for 250 and 2 hours respectively, whereas rubber produced according to Example 2 could withstand heating to the above-mentioned temperatures for 450 and 15 hours respectively.

EXAMPLE 3

A rubber mixture was prepared from the following components, the amounts being expressed in parts by weight:

(1) Polydimethylsiloxane _____ 100
(2) Poly(methylethoxyphosphineoxy) aluminumdimethylsiloxane _____ 10
(3) Highly dispersed silicon dioxide _____ 40
(4) Benzoyl peroxide _____ 3

Poly(methylethoxyphosphineoxy)aluminumdimethylsiloxane has the following structure:

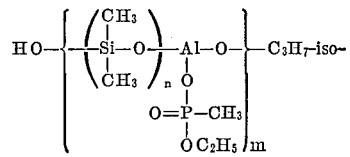

wherein, $n$ is an integer from 77 to 600; and was synthesized by the condensation reaction of $\alpha,\omega$-dihydroxypolydimethylsiloxane with methylethoxyphosphineoxydiisopropoxyaluminum.

EXAMPLE 4

A rubber mixture was prepared from the following components, the amounts being expressed in parts by weight:

(1) Polydimethylsiloxane _____ 100
(2) Polyorganoborodimethyl(methylphenyl) siloxane _____ 10
(3) Highly dispersed silicon dioxide _____ 40
(4) Benzoyl peroxide _____ 3

Polyorganoborosiloxane has the following structure:

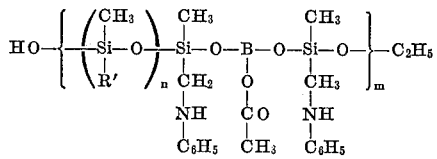

wherein R' is —CH₃ or —C₆H₅; and n is an integer from 127 to 500; and was synthesized by condensation reaction of α, ω - dihydroxypolydimethyl(methylphenyl)siloxane with bis - (phenylaminomethylethoxymethylsilyl)acetoxyboroxane.

EXAMPLE 5

A rubber mixture was prepared from the following components, the amount being expressed in parts by weight:

(1) Polydimethylsiloxane _____ 100
(2) Polymethylphosphineoxy-(methylphenyl)-siloxane _____ 15
(3) Highly dispersed silicon dioxide _____ 40
(4) Benzoyl peroxide _____ 3

Polymethylphosphineoxy(methylphenyl)siloxane has the following structure:

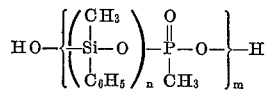

wherein n is an integer=100 to 130; and was synthesized by copolymerization reaction of methylphosphineoxycyclosiloxane with octamethylcyclotetrasiloxane taken in the required ratio. The preparation and vulcanization of the rubber mixture in Examples 3–5 were carried out as described in Examples 1 and 2. The aging of the rubber mixtures was carried out at 300 and 350° C. The results obtained were analogous to those summarized in Tables 1, 2, and 3.

It should be noted that the maximum effect was exhibited by polyorganoelementodimethyl(methylphenyl) siloxanes in the case where they were prepared together with metal oxides such as iron oxide.

Thus the insulation of electric wire with the rubber produced according to Example 2 withstood heating to 300° C. for more than 2,000 hours and to 350° C. for 40 hours, without cracking when strained whereas insulation made of standard rubber withstood heating to the above-mentioned temperatures for 500 and 2 hours respectively.

What we claim is:

1. A method of producing heat-resistant rubber comprising vulcanizing a mixture consisting of a polydiorganosiloxane having the formula:

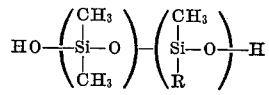

wherein R is a radical seelcted from the group consisting of —CH₃, —CH=CH₂, —C₆H₅,

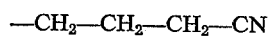

—CH₂—CH₂—CH₂—CN and CH₂—CH₂—CF₃; an oligomer of a polyorgano-elementodimethyl(methylphenyl) siloxane having the formula:

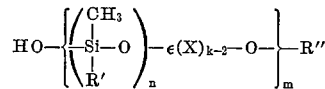

wherein:
ε is an element selected from the group consisting of B, Al, Ti and P;
R' is a radical selected from the group consisting of —CH₃, —C₆H₅ and —CH₂NHC₆H₅;
R" is a radical selected from the group consisting of —C₂H₅, —iso—C₃H₇, and —C₄H₉;
k is the valence of the element ε;
X is a radical selected from the group consisting of —OCOCH₃, —CH₃ and —OPO(CH₃)R'", wherein R'" is a radical selected from the group consisting of —CH₃, —OCH₃, —OC₄H₉, —OC₂H₅ and —OC₆H₅;
n is an integer from 29 to 1800; and
m is an integer from 2 to 4;

a filler, a vulcanizing agent and a metal oxide, said polyorganoelementodimethyl (methylphenyl) siloxane being present in an amount of 5–25 parts by weight per 100 parts by weight of polydiorganosiloxane.

2. A method as claimed in claim 1 wherein the filler is highly dispersed silicon dioxide.

3. A method as claimed in claim 1 wherein the vulcanizing agent is a peroxide.

4. A method as claimed in claim 1 wherein the polyorganoelementodimethyl (methylphenyl) siloxane is bis-(methylbutoxyphosphineoxy) titanodimethyl (methylphenyl) siloxane.

5. A method as claimed in claim 1 wherein the metal oxide is iron oxide.

6. A method as claimed in claim 1 wherein the metal oxide is titanium dioxide.

7. A method as claimed in claim 3 wherein the peroxide is benzoyl peroxide.

8. A method of producing heat-resistant rubber comprising vulcanizing a mixture consisting of a polydiorganosiloxane having the formula:

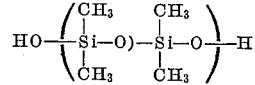

wherein R is a radical seelcted from the group consisting of —CH₃, —CH=CH₂, —C₆H₅,

—CH₂—CH₂—CH₂—CN and CH₂—CH₂—CF₃; an oligomer of a polyorganoelementodimethyl (methylphenyl) siloxane having the formula:

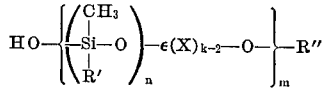

wherein:
ε is an element selected from the group consisting of B, Al, Ti and P;
R' is a radical seelcted from the group consisting of —CH₃, —C₆H₅ and —CH₂NHC₆H₅;
R" is a radical selected from the group consisting of —C₂H₅, —iso—C₃H₇, and —C₄H₉;
k is the valence of the element ε;
X is a radical selected from the group consisting of —OCOCH₃, —CH₃ and —OPO(CH₃)R'", wherein R'" is a radical selected from the group consisting of —CH₃, —OCH₃, —OC₄H₉, —OC₂H₅ and —OC₆H₅;
n is an integer from 29 to 1800; and
m is an integer from 2 to 4;

a filler, and a vulcanizing agent, said polyorganoelementodimethyl (methylphenyl) siloxane being present in an amount of 5–25 parts by weight per 100 parts by weight of polydiorganosiloxane.

References Cited

UNITED STATES PATENTS 3,441,537   4/1969   Lengnick _____ 260—37(Si)X

MORRIS LIEBMAN, Primary Examiner

L. T. JACOBS, Assistant Examiner

U.S. Cl. X.R.

206—46.5